(12) United States Patent
Bitman et al.

(10) Patent No.: US 9,323,043 B2
(45) Date of Patent: Apr. 26, 2016

(54) METHOD FOR PRODUCING A DISPLAY ELEMENT FOR AN ELECTRO-WETTING DISPLAY AND A DISPLAY ELEMENT FOR AN ELECTRO-WETTING DISPLAY

(71) Applicant: advanced display technology AG, Appenzell (CH)

(72) Inventors: Andriy Bitman, Dortmund (DE); Markus Rawert, Coesfeld (DE); Oliver Mueller-Marc, Appenzell (CH); Dieter Jerosch, Bad Soden (DE)

(73) Assignee: Advanced Display Technology AG, Appenzell (CH)

( * ) Notice: Subject to any disclaimer, the term of this patent is extended or adjusted under 35 U.S.C. 154(b) by 313 days.

(21) Appl. No.: 13/773,745

(22) Filed: Feb. 22, 2013

(65) Prior Publication Data

US 2014/0071515 A1    Mar. 13, 2014

(30) Foreign Application Priority Data

Feb. 27, 2012  (DE) .......................... 10 2012 101 542

(51) Int. Cl.
*G02B 26/00*  (2006.01)
*G02B 26/02*  (2006.01)
*B29D 11/00*  (2006.01)

(52) U.S. Cl.
CPC .......... *G02B 26/005* (2013.01); *B29D 11/0073* (2013.01); *G02B 26/02* (2013.01); *G02B 2207/115* (2013.01)

(58) Field of Classification Search
CPC ................. F21W 2131/406; G02B 26/0841; G02B 26/008; G02B 26/0833; G02B 5/32; G02B 6/264; G02B 6/32; G02B 26/085; F21S 10/007; G09G 3/001; G09G 3/34; G09G 3/346; G03B 21/008; G03B 21/14; G03B 21/16
USPC .......... 359/245, 250–253, 290–299; 345/107, 345/173, 55
See application file for complete search history.

(56) References Cited

U.S. PATENT DOCUMENTS

| 5,717,283 | A  | * | 2/1998  | Biegelsen et al. ............. 313/483 |
| 6,284,352 | B1 | * | 9/2001  | Biegelsen et al. ............. 428/207 |
| 6,700,556 | B2 | * | 3/2004  | Richley et al. .................. 345/84 |
| 7,283,119 | B2 | * | 10/2007 | Kishi ............................. 345/107 |
| 7,443,570 | B2 | * | 10/2008 | Chopra et al. ................ 359/296 |
| 7,787,169 | B2 | * | 8/2010  | Abramson et al. ............ 359/267 |

(Continued)

FOREIGN PATENT DOCUMENTS

WO    2010136013 A1   12/2010

*Primary Examiner* — Scott J Sugarman
*Assistant Examiner* — Vipin Patel
(74) *Attorney, Agent, or Firm* — Marshall & Melhorn, LLC

(57) ABSTRACT

To produce a display element for an electrowetting display, there is provided a quantity of fluid which is greater than both the first volume of a display chamber and the second volume of a reservoir chamber, but less than the sum of the first volume and second volume. The fluid is divided into first and second partial drops, the first being introduced into the display chamber, the second being introduced into the reservoir chamber. The display and reservoir chambers are brought together so that a first opening in a first intermediate film of the display chamber and a second opening in a second intermediate film of the reservoir chamber at least partly overlap. An electrical field is applied to the display chamber and to the reservoir chamber, thereby uniting the first partial drop and the second partial drop.

6 Claims, 2 Drawing Sheets

(56) References Cited

U.S. PATENT DOCUMENTS

| | | |
|---|---|---|
| 2003/0020685 A1 | 1/2003 | Richley |
| 2008/0130087 A1 | 6/2008 | Miyata |
| 2010/0231528 A1* | 9/2010 | Wolfe et al. ............... 345/173 |
| 2012/0105935 A1 | 5/2012 | Bitman |

* cited by examiner

METHOD FOR PRODUCING A DISPLAY ELEMENT FOR AN ELECTRO-WETTING DISPLAY AND A DISPLAY ELEMENT FOR AN ELECTRO-WETTING DISPLAY

This invention relates to a method for producing a display element for an electrowetting display as well as a display element which can be advantageously produced using the described method.

Three-dimensional structures of a display element for an electrowetting display are known, for example, from WO 2010/136013 A1. The display element, which is also called a pixel, thereby consists of two volumes lying one on top of the other, which are separated from each other by an intermediate layer which is generally non-transparent, whereby this intermediate layer has a fluidic transition for the first fluid in the form of an opening through which, when an electric field is applied, the fluid can pass over from the first volume into the other volume. The two volumes are therefore in the form of a display chamber or a reservoir chamber, whereby only the display chamber is visible and the reservoir chamber, which lies behind the display chamber in the direction of observation, remains hidden from the observer.

With structures of this type for display elements, there are problems with the filling process. The correct amount of fluid to be added must be placed in the reservoir chamber so that a relatively small quantity must project from the reservoir chamber through the opening and be in contact with the control electrode which is located there. The reverse situation exists when the fluid drop which is held in stable fashion in the display chamber must be transported back into the reservoir chamber.

The quantity of fluid that projects through the opening means there is a certain degree of instability of the drop during the rest of the assembly steps during the assembly of the electrowetting display. Sometimes even small vibrations will be sufficient to allow the drop to undesirably escape from the reservoir chamber onto surfaces of the display chamber. In particular with high-pixel-count displays, even on the order of magnitude of 10×14 pixels, it becomes difficult to fill the reservoir chamber correctly. If the quantity of fluid poured in is reduced, although its position is more stable, it can happen that the drop does not then make contact with the electrode, which results in a pixel error.

As the intermediate layer, which is also called the intermediate electrode, thin plastic films are used, preferably made of polyethylene terephthalate. An additional purpose of these intermediate layers is to ensure that the view of the reservoir chamber remains concealed. A white reflecting layer would conventionally be optimal. A white intermediate layer which simultaneously meets the requirements of electrowetting cannot be easily provided because the base materials are generally transparent and must be colored. The additives used for the coloration, for example, increase the roughness values, which alters the hydrophobic behavior of the surface. The flexibility with regard to a modification of the reflectivity of the intermediate layer is therefore very limited.

The object of the invention is to make available a method for producing a display element for an electrowetting display or a display element in which the difficulties and problems described above are largely eliminated.

This object is accomplished by the method described in claim 1 and a display element as described in claim 6. Advantageous developments of the invention are the object of the respective dependent claims.

The method described by the invention comprises the following steps:

a) Provision of a display chamber with a first volume, the bottom of which is formed by a first intermediate film which has a first opening, whereby the display chamber is closed by an at least partly transparent cover which is at some distance from the first intermediate film;

b) Provision of a reservoir chamber for fluid with a second volume, the bottom of which is formed by a substrate and which has a second intermediate film at some distance from it which closes the reservoir chamber and has a second opening;

c) Provision of a quantity of fluid which is greater than both the first volume as well as the second volume but is less than the sum of the first volume and second volume;

d) Division of the quantity of fluid into a first partial drop and a second partial drop;

e) Introduction of the first partial drop into the display chamber;

f) Introduction of the second partial drop into the reservoir chamber;

g) Bringing together of the display chamber and the reservoir chamber so that the first opening and the second opening at least partly overlap;

h) Application of an electrical field to the display chamber and to the reservoir chamber, thereby connecting the first and the second partial drops.

In the practical embodiment, first the required volume of fluid or quantity of fluid will be determined, this volume or quantity will then be divided in half, for example, and the partial drops will be filled into the reservoir chamber or into the display chamber. The quantity of fluid does not need to be divided exactly in half. Many other division ratios are possible, which significantly simplifies the filling process. Then the display chamber and the reservoir chamber are brought together, whereby optionally a function layer is also inserted as an intermediate layer, the functionality of which is explained in greater detail below. After the application of an electrical field to the display chamber and to the reservoir chamber, the first and second partial drops are connected. If one of the fields is then turned off, the fluid is transported into the respective other chamber. The previously defined quantity of fluid ensures that the requirements set for the electrowetting are met and in particular the contact with the control electrode is maintained. With this method, the measured quantity of fluid added during the filling and assembly handling is always ensured in the respective chamber.

Conventionally, before the chambers are brought together, a second fluid which cannot be mixed with the first fluid is filled into the reservoir chamber. Fluids suitable for electrowetting include propylene carbonate and decane, for example.

The display element described by the invention is therefore characterized in that the intermediate layer is constructed of at least two intermediate films, whereby a first intermediate film is associated with the display chamber and a second intermediate film is associated with the reservoir chamber. The respective intermediate film now has, on the surface facing away from the volume, no function that is essential for the electrowetting. Therefore this surface is available for an additional functionality. For example, one or both surfaces can be coated with color layers, with reflective or fluorescing layers. In this manner it is no longer a problem to configure a white reflector layer for display elements. The use of other colors is also conceivable. For example, a green color layer in connection with a red fluid can realize a red/green reversal. In special cases, however, a color gradient is also conceivable. Other reflective materials such as metals, for example, can also be used, as well as fluorescing materials. The surfaces can also be used for the feed of the electrical contacts to the display, or can have light-emitting materials such as OLEDs, for example, locally or over the entire surface. Feed and/or discharge channels for fluids can also be provided, which is particularly advantageous if, for example, the colored fluid must be replaced. This functionality can also be provided in a separate function layer which is introduced as an intermediate layer between the two intermediate layers. An intermediate layer of this type must then naturally have openings that correspond to the openings and return openings, so that the fluid connection of the display chamber and the reservoir chamber can be maintained as is conventional.

The invention is described in greater detail below on the basis of the accompanying drawings, in which:

FIG. 1 is a side view of a display chamber and a reservoir chamber, each with partial drops that have already been filled in;

Figure 1:
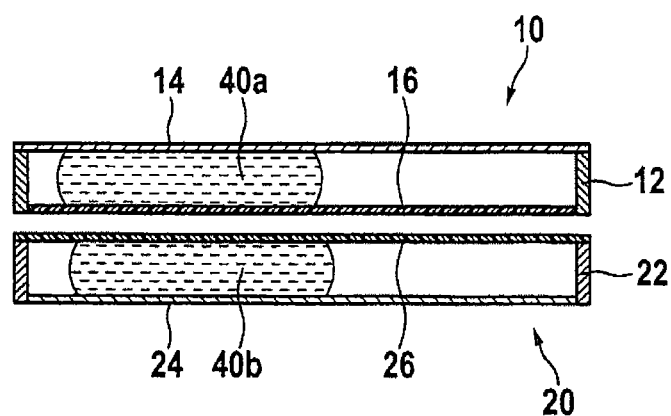

FIG. 1 shows a display chamber 10 and a reservoir chamber 20, both of which are constructed symmetrically and enclose the same volumes. The display chamber 10 comprises an encircling side wall 12 and is closed with a cover 14.

Figure 5:
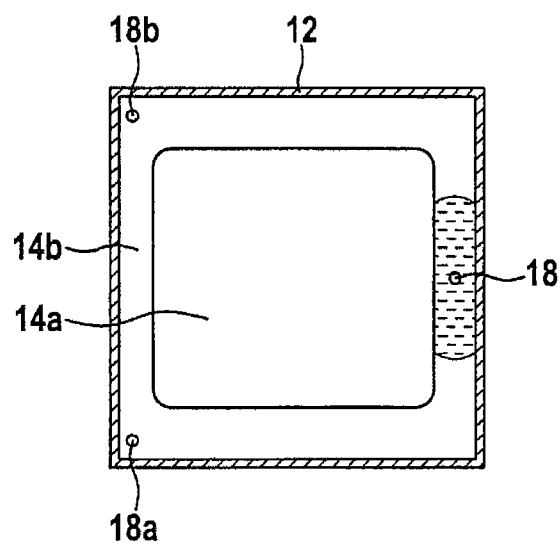
FIG. 5 is a plan view of a display element described by the invention.

The cover 14 is more clearly illustrated in FIG. 5, which is a plan view of a display element described by the invention. The cover 14 is glued in or on the side wall 12 and has a transparent viewing part 14a as well as an encircling frame 14b. In the illustrated embodiment, the frame 14b is not transparent, although it can also be transparent, and covers, among other things, an opening 18 which, if essentially all of the colored fluid as shown here is held in the reservoir chamber 20, would instead convey a color effect. The return openings 18a, 18b are also covered.

With reference to FIG. 1 once again, the display chamber 10 has a first intermediate film 16 as the bottom. This intermediate film 16 can be a plastic film, preferably made of polyethylene terephthalate, although it can also be made of metal or very thin glass. The intermediate film 16 contains the opening already discussed in connection with FIG. 5 as well as openings that form return channels.

In a symmetrical structure, the reservoir chamber 20 has an encircling side wall 22 which is placed on or over a substrate 24. The reservoir chamber 20 is closed by a second intermediate film 26 which, like the first intermediate film 16, can be made of plastic or glass. The intermediate film 26 also has an opening and return openings which later, during assembly, are made to overlap with the corresponding openings of the display chamber 10.

A quantity of fluid is determined and is measured so that when the display element is assembled, it completely fills either the display chamber 10 or the reservoir chamber 20 and is also in contact with the control electrodes which are necessary for the electrowetting process. In the example illustrated in FIG. 1, this determined quantity of fluid is now divided into approximately two halves, whereby a first partial drop 40a is then filled into the display chamber 10 and a second partial drop 40b is filled into the reservoir chamber 20. Then a second fluid such as decane, for example, which does not mix with the first fluid, which can be propylene carbonate, for example, is filled into an immersion bath. The display chamber 10 and the reservoir chamber 20 are now basically prepared for the assembly, which is also carried out in the immersion bath of the second fluid.

The exposed surfaces of the intermediate films 16, 26 can be provided with a colored layer, a reflecting layer or a fluorescing layer or, as an alternative, it can additionally be provided with printed electronics. This functionality can be imparted in advance to the intermediate films 16, 26, which has advantages in terms of manufacturing technology. The intermediate films 16, 26 also define a multifunctional portal, so that prior to the assembly, for example, electrical contacts for the display can be located between the intermediate layers 16, 26. It is conceivable to provide light-emitting elements such as OLEDS, for example, locally here or over the entire surface. All this functionality can also be installed in a function layer 30 as an intermediate layer, as illustrated in a greatly simplified and very schematic fashion in FIG. 2.

Figure 2:
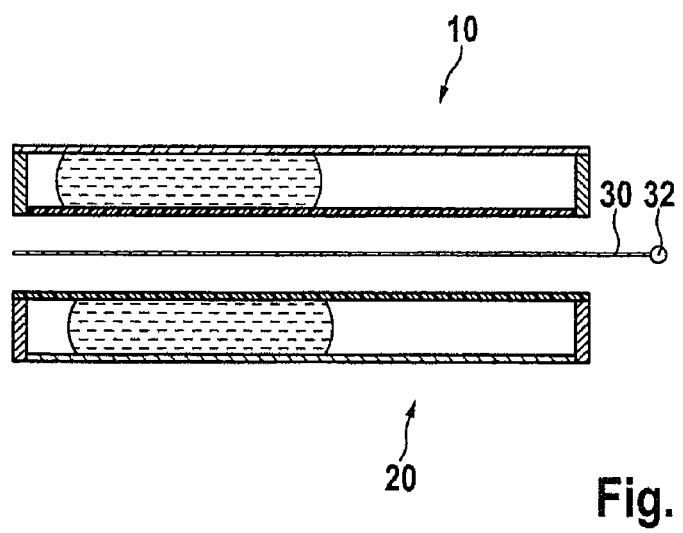
FIG. 2 is a view like the one in FIG. 1, although a functional layer is placed between the display chamber and the reservoir chamber.

In FIG. 2, the filled display chamber 10 and the filled reservoir chamber 20 are shown one above the other, whereby between them there is a function layer 30 which carries the above mentioned functionalities such as coatings or imprints, whereby the possibility of an electrical connection can be provided at 32. The function layer 30 has corresponding openings and return openings so that the fluid connection between the display chamber 10 and the reservoir chamber 20 is preserved even when the function layer 30 is used. Before the display chamber 10 and/or the reservoir chamber 20 is/are filled, the function layer 30 can be fastened to one of them.

Figure 3:
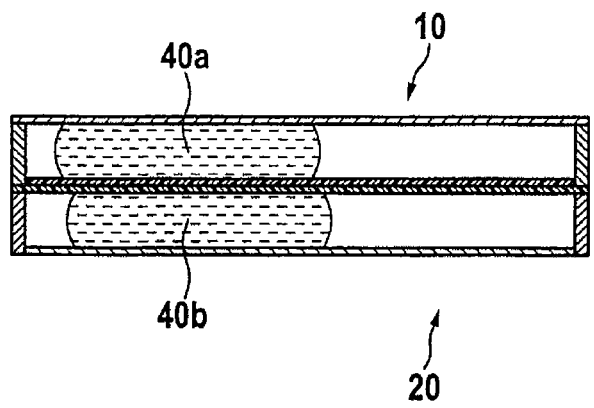
FIG. 3 shows the display chamber and the reservoir chamber from FIG. 1, which are brought together to form a display element.

FIG. 3 shows the display chamber 10 combined into a display element with a reservoir chamber 20 connected to it by means of conventional laminate technologies. An electrical field is then applied to both chambers 10, 20, so that the partial drops 40a, 40b can be moved in a direction toward the opening 18 (FIG. 5) where they are united. Then one of the electrical fields is turned off, so that the drop is retracted from the corresponding chamber.

Figure 4:
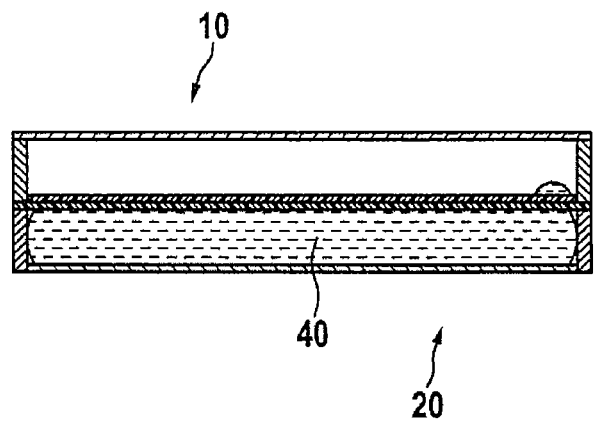
FIG. 4 shows a side view of the combined display element after the partial drops have been united and the electrical field of the display chamber has been turned off.

In the situation illustrated in FIG. 4, the electrical field of the display chamber 10 is turned off, so that the fluid is pulled back into the reservoir chamber 20, although it thereby projects to some degree through the opening 18 (FIG. 5) and contacts the electrode that is located there.

The features of the invention disclosed in the preceding description, in the drawings and in the claims can be essential for the realization of the invention both individually as well as in any desired combination.

The invention claimed is:

1. A method for producing a display element for an electrowetting display with the steps:
    a) providing a display chamber with a first volume, the bottom of which is formed by a first intermediate film which has a first opening, whereby the display chamber is closed by an at least partly transparent cover which is at some distance from the first intermediate film;
    b) providing a reservoir chamber for fluid with a second volume, the bottom of which is formed by a substrate and which has a second intermediate film at some distance from it which closes the reservoir chamber and has a second opening;
    c) providing a quantity of fluid which is greater than both the first volume as well as the second volume but is less than the sum of the first volume and second volume;
    d) dividing the quantity of fluid into a first partial drop and a second partial drop;
    e) introducing the first partial drop into the display chamber;

f) introducing the second partial drop into the reservoir chamber;
g) bringing together the display chamber and the reservoir chamber so that the first opening and the second opening at least partly overlap; and
h) applying an electrical field to the display chamber and to the reservoir chamber, thereby uniting the first partial drop and the second partial drop.

2. The method recited in claim 1, wherein the steps e) and f) are carried out in a vacuum process.

3. The method recited in claim 1, wherein before step g), a second fluid which is not miscible with the first fluid is filled into the reservoir chamber and into the display chamber.

4. The method recited in claim 3, wherein the filling of the second fluid and the bringing together of the reservoir chamber and the display chamber are carried out in an immersion bath of the second fluid.

5. The method recited in claim 1, wherein before step g), a function layer is applied either to the first intermediate film on its side that faces away from the display chamber or to the second intermediate film on its side that faces away from the reservoir chamber, or is located in the form of a separate function layer between the first and the second intermediate films.

6. The method recited in claim 1, wherein the first volume is defined in part by the first intermediate film and the cover, and wherein the second volume is defined in part by the second intermediate film and the substrate.

\* \* \* \* \*